Jan. 5, 1932.   C. A. BREIT   1,840,020
VEHICLE DOOR CONTROL
Filed March 21, 1930
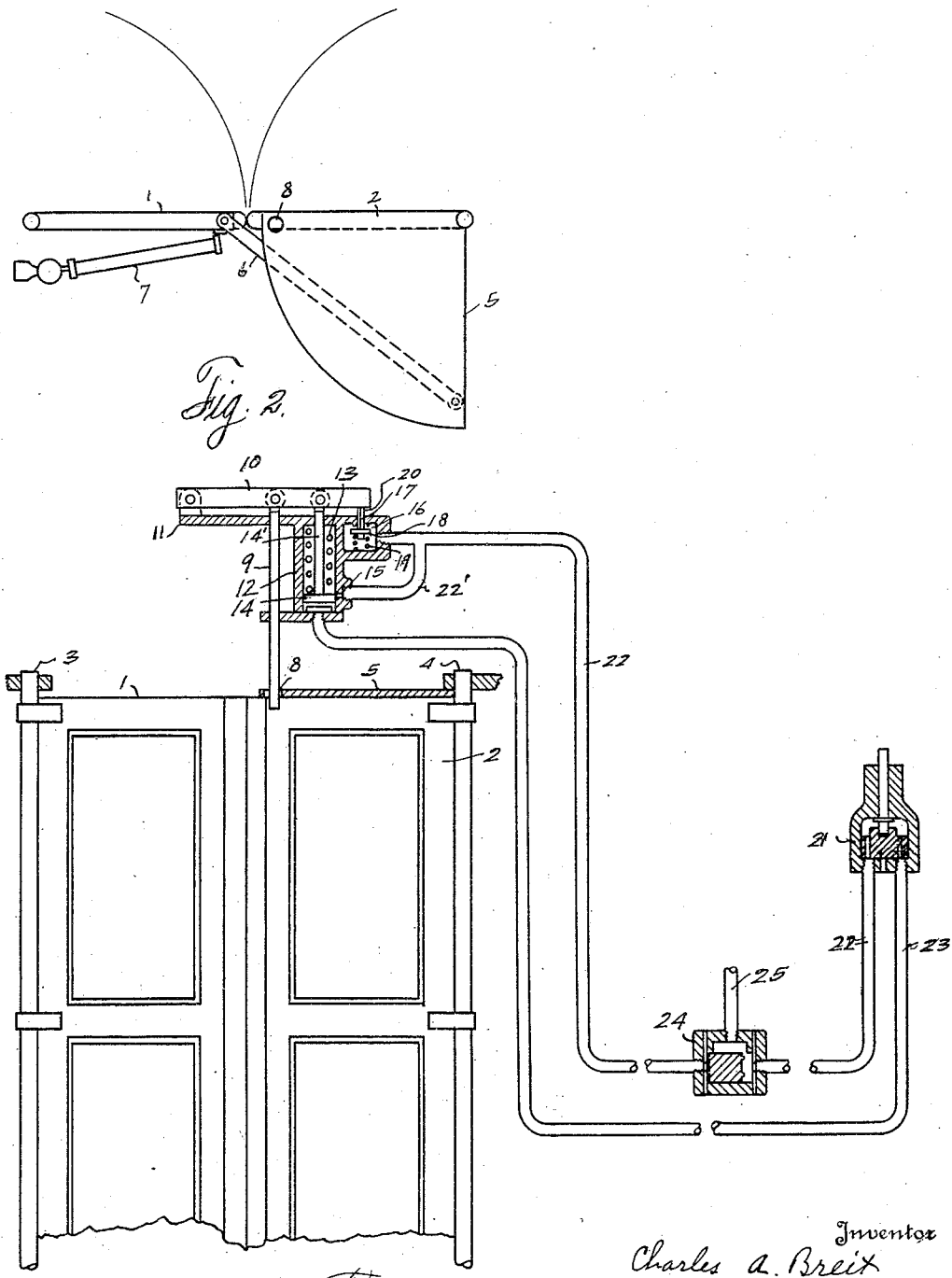

Patented Jan. 5, 1932

1,840,020

UNITED STATES PATENT OFFICE

CHARLES A. BREIT, OF HOUSTON, TEXAS

VEHICLE DOOR CONTROL

Application filed March 21, 1930. Serial No. 437,778.

This invention relates to new and useful improvements in vehicle doors.

One object of the invention is to provide vehicle doors, preferably rear doors, for vehicles, such as street cars, busses and the like, arranged to be manually opened and automatically closed, but which can be opened only when the vehicle brakes are applied and which must be completely closed before the brakes can be released.

Another object of the invention is to provide means, incorporated into the air brake system of the vehicle, through which the doors may be released, to be manually opened, only when the brakes are set and through which the release of the brakes is prevented until the doors are fully closed.

With the above and other objects in view, this invention has particular relation to certain novel features of construction, operation and arrangement of parts an example of which is given in this specification and illustrated in the accompanying drawings, wherein:—

Figure 1 shows a fragmentary view of the doors, viewed from the inside, showing also the means through which said doors may be locked in closed position and the brakes released when the doors are closed, shown partly in section, and Figure 2 shows a plan view of the doors.

Referring more particularly to the drawings wherein like numerals of reference designate similar parts in each of the figures, the numerals 1 and 2 designate outwardly swinging doors which are supported on the vertical rotatable shafts 3 and 4. A substantially horizontal segmental plate 5 is attached to the upper end of the door 2 and a cross link 6 is pivoted at one end to the top of the door 1 near its inner margin and at its other end to the underside of the plate 5 near its outer margin and through this link the doors are caused to swing open and shut simultaneously. The doors are normally held in closed position by means of a conventional spring check 7 which is connected at one end to the door 1 and at its other end to a stationary part of the vehicle. The plate 5 has a latch bearing 8 adjacent the door through which the plunger like latch 9 may work. The upper end of this latch is pivotally connected to the lever 10 one end of which is pivotally connected to a suitable anchor as 11. Depending from said anchor 11 there is also a cylinder 12 in which there is a coil spring 13 and beneath this spring there is a plunger 14 which fits closely in said cylinder and which is normally held at the lower end of the cylinder by said spring. This plunger is connected to the lever 10 above by a suitable plunger rod 14' and in one side of the cylinder there is a port 15 which is normally closed by the plunger 14. Adjacent the cylinder 12 there is an air chamber 16 having an outlet port 17 which at times is closed by an inside valve 18. This valve is held seated to close the port 17 by means of the coil spring 19 and the valve 18 has a push rod 20 attached thereto which works through the port 17. There is a conventional brake valve 21 located so as to be readily controlled by the operator of the vehicle. Leading from the casing of this valve there are two air lines 22, 23 the former of which also enters the chamber 16 and has a branch line 22' entering the port 15. The other line 23 enters the bottom of the cylinder 12. Incorporated into the line 22 there is a double check valve 24 and leading from the casing of this valve there is an air line 25 which leads to the conventional brake cylinder, not shown, through which air is supplied to set the brakes.

Normally the latch 9 is projected through its bearing 8 against the outer side of the door 2 so as to prevent said doors from being opened.

The operator can manipulate the valve 21 into the position shown so as to admit air through the lines 22, 25 to the brake cylinder for the purpose of setting the brakes without affecting the latch 9 or unlocking the doors and by a suitable manipulation of said valve 21 the air can be released to the atmosphere from said brake cylinder. However if it be desired to unlatch the doors to permit them to be opened the valve 21 may be manipulated to admit air to the line 23 as well as to the line 22. The air under pressure from line 22 will pass the check valve 24 and will pass on through line 25 to brake cylinder and will set the brakes and the pressure from the line 23 will enter the cylinder 12 and will move the plunger 14 upwardly, first releasing the lever 10 from the valve rod 20 and permitting the valve 18 to close and then uncovering the port 15 to admit air through the bypass 22' into the line 22 and the final movement of the plunger 14 will operate through the lever 10 to withdraw the latch 9 from its bearing 8. The doors 1 and 2 are now free to be opened manually, but the brakes, it is to be noted, are still applied.

When the doors 1 and 2 are closed, the brakes may be released by operating the valve 21 to released position, that is, into position to open the lines 22, 23 to the atmosphere. Thereupon the piston of the double check valve 24 will move over to prevent the escape of air from the pipe 22 through the valve 21 but the downward movement of the lever 10 by means of spring 13 will operate to open the valve 18 permitting the exhaust of the air from the brake cylinders through the port 17.

If the operator attempts to release the brakes by means of the valve 21 when the rear doors 1 and 2 are open, the pipes 22, 23 will be opened to the atmosphere as above stated, and the piston of the double check valve 24 will move over due to the pressure of the air admitted through the bypass 22' so as to cut off the brake valve exhaust. With the doors 1 and 2 open, the latch 9 cannot drop down into the bearing 8 but is held up by the plate 5. At this time, the lever 10 has not come down far enough to open the valve 18 and the brake cylinder pressure is trapped and the brakes therefore can not be released when said rear doors are open.

The drawings and description disclose what is now considered to be a preferred form of the invention, by way of illustration only, while the broad principle of the invention will be defined by the appended claims.

What I claim is:

1. In a vehicle having means for controlling the application of fluid, under pressure, to the brakes thereof; a door mounted to swing on a vertical axis, a latch mounted to engage and lock the door in closed position, said controlling means being effective to permit the application of fluid pressure to set the brakes and to simultaneously release the latch to permit the door to be opened manually, and to permit release of the brakes only when the door is fully closed.

2. In a vehicle having a device for controlling the application of fluid, under pressure, to the brakes thereof; a swingable door, a releasable latch mounted to engage and lock the door in closed position, said controlling device including means under the control of an operator whereby fluid, under pressure, may be applied to the brake mechanism to set the brakes and simultaneously release the latch to permit the door to be opened manually, and whereby the brakes may be released only when the door is fully closed.

3. In a vehicle having a device for controlling the application of fluid under pressure to the brakes of the vehicle; a door for the vehicle mounted to open and close, releasable means mounted to engage and lock the door in closed position, said controlling device including means under the control of the operator movable into one position to effect the application of fluid under pressure to the brake mechanism to set the brakes, and movable into another position to effect the application of fluid under pressure to the brake mechanism to set the brakes and to said releasable means to effect the release thereof from said door, said controlling device being movable into a third position to effect the release of the pressure fluid from said releasable engaging means to permit the movement of said releasable engaging means into original locking position.

4. In a vehicle having a device for controlling the application of fluid under pressure to the brakes of the vehicle; a door for the vehicle mounted to open and close, releasable means mounted to engage and lock the door in closed position, said controlling device including means under the control of the operator movable into one position to effect the application of fluid under pressure to the brake mechanism to set the brakes, and movable into another position to effect the application of fluid under pressure to the brake mechanism to set the brakes and to said releasable means to effect the release thereof from said door, said controlling device being movable into a third position to effect the release of the pressure fluid from said releasable engaging means to permit the movement of said releasable engaging means into original locking position, and means arranged to automatically release the fluid pressure from the brake mechanism only when said door is in its closed position.

5. In a vehicle having a device for controlling the application of fluid, under pressure, to the brakes of the vehicle; a door mounted to be manually opened, means for automatically closing said door, means normally locking said door in closed position, means under the control of the operator for releasing said locking means to unlock the door, means to apply said brakes when the door is unlocked, means to prevent the release of the brakes when the door is open and means to lock said door in closed position and to release the brakes only when the door is fully closed.

In testimony whereof I have signed my name to this specification.

CHARLES A. BREIT.